United States Patent [19]

Nakabayashi et al.

[11] Patent Number: 4,686,133
[45] Date of Patent: Aug. 11, 1987

[54] CLOSURE MATERIAL FOR SEALING GLASS CONTAINERS

[75] Inventors: Masamitsu Nakabayashi, Osaka; Hideo Kawai, Sakai; Suminori Tatsukawa; Masayuki Kaji, both of Osaka, all of Japan

[73] Assignees: Takeda Chemical Industries, Ltd.; Showa Aluminum Corporation, both of Osaka, Japan

[21] Appl. No.: 704,241

[22] Filed: Feb. 22, 1985

[30] Foreign Application Priority Data

Feb. 24, 1984 [JP] Japan ................................. 59-34873

[51] Int. Cl.⁴ ..................... B32B 15/08; B32B 27/00
[52] U.S. Cl. .................................. 428/209; 428/323; 428/344; 428/349; 428/355; 428/356; 428/461
[58] Field of Search ............... 428/344, 349, 209, 323, 428/355, 356, 461

[56] References Cited

U.S. PATENT DOCUMENTS

| | | | |
|---|---|---|---|
| 4,358,493 | 11/1982 | Ohtsuki et al. | 428/356 |
| 4,390,552 | 6/1983 | Niwa | 426/126 |
| 4,407,689 | 10/1983 | Ohtsuki et al. | 428/461 |
| 4,442,129 | 4/1984 | Niwa et al. | 428/349 |

FOREIGN PATENT DOCUMENTS 58-20604  2/1983  Japan .
60-27533  2/1985  Japan .

Primary Examiner—George F. Lesmes
Assistant Examiner—S. A. Gibson
Attorney, Agent, or Firm—Armstrong, Nikaido, Marmelstein & Kubovcik

[57] ABSTRACT

A closure material for sealing glass containers comprising a metal foil and a thermally adhesive composition layer formed on one surface of the metal foil and comprising a carboxyl-modified saponified product of ethylene-vinyl acetate copolymer and up to 30 parts by weight of an inorganic compound per 100 parts by weight of the carboxyl-modified saponified product, the carboxyl-modified saponified product being prepared by graft-polymerizing a carboxylic acid group-containing unsaturated compound with a saponified product of ethylene-vinyl acetate copolymer containing 50 to 97 mole % of ethylene.

14 Claims, 2 Drawing Figures

CLOSURE MATERIAL FOR SEALING GLASS CONTAINERS

BACKGROUND OF THE INVENTION

The present invention relates to a closure material for sealing glass containers.

Bottles or like glass containers filled with powdery, liquid or fluid food are sealed usually by crimping a metal cap around the mouth of the container, or firmly screwing a threaded cap on the mouth, or fixedly fitting a crown around the mouth. However, such a cap or crown has the problem of being relatively difficult to open and costly.

It is also practice to coat the lip of glass bottles with a thermoplastic resin and intimately affix a closure material to the resin coating by heat sealing. This method nevertheless involves the likelihood that the resin of the closure will partially remain on the lip when the container is opened to impair the appearance of the container, while the coating of the lip with the resin in advance requires an additional step to render the container inefficient and costly to manufacture.

In the case of glass containers containing powder food, it is also practice to affix a closure to the mouth of the glass container with an adhesive, but this method has the problem that the closure is difficult to remove when opening the container and permits the adhesive to remain on the container mouth portion.

Further in recent years, a method has been developed wherein a closure coated with a thermally adhesive resin is adhered to the mouth of glass containers by heat sealing without coating the lip of the container with resin. The thermally adhesive resin used for this method is, for example, a resin obtained by neutralizing with a metal ion a copolymer of ethylene and $\alpha, \beta$-ethylenically unsaturated carboxylic acid (see Published Unexamined Japanese Patent Application Laid-Open No. SHO 06-27533), or a resin prepared by graft-polymerizing an unsaturated carboxylic acid with a hydrolyzed product of ethylene-vinyl acetate copolymer (see Published Unexamined Japanese Patent Application Laid-Open No. SHO 58-20604 which corresponds to U.S. Pat. No. 4,442,129) the former resin is used for this method, the lip of the glass container needs to be coated with a metallic oxide in advance. When the latter resin is used, it is required to preheat the glass container before it is filled with food and to heat-seal the closure usually at a high temperature of 210° to 280° C., hence a cumbersome sealing procedure. Moreover, the conventional method which requires a high temperature for heat sealing is not usable for dessert and chilled food which must be maintained at a temperature lower than room temperature and has the problem of requiring a high equipment cost for the filling-sealing apparatus and a high operating cost because of the high heat-sealing temperature.

SUMMARY OF THE INVENTION

This invention has overcome the foregoing problems and provides a closure material for sealing glass containers comprising a metal foil and a thermally adhesive composition layer formed on one surface of the metal foil and comprising a carboxyl-modified saponified product of ethylene-vinyl acetate copolymer and up to 30 parts by weight of an inorganic compound per 100 parts by weight of the carboxyl-modified saponified product, the carboxyl-modified saponified product being prepared by graft-polymerizing a carboxylic acid group-containing unsaturated compound with a saponified product of ethylene-vinyl acetate copolymer containing 50 to 97 mole % of ethylene.

Generally, the glass containers to be sealed with the closure material are those made of soda-lime glass.

Aluminum foil is usually used as the metal foil, while other metal foils may be used. The aluminum foil to be used is 20 to 100 $\mu$m, preferably 40 to 60 $\mu$m, in thickness.

The carboxyl-modified saponified product of ethylene-vinyl acetate copolymer, one component of the thermally adhesive composition layer, is prepared by saponifying an ethylene-vinyl acetate copolymer containing 50 to 97 mole %, preferably 70 to 92 mole %, of ethylene and having a melt index of 1 to 300 g/10 minutes (according to ASTM 1238-65T) to obtain a saponified product having a hydroxyl equivalent weight of 100 to 3000 g/equivalent, preferably 200 to 1000 g/equivalent and graft-polymerizing a carboxylic acid group-containing unsaturated compound. The carboxylic acid group-containing unsaturated compound to be used is at least one compound selected from the group consisting of acrylic acid, methacrylic acid, crotonic acid, itaconic acid and citraconic acid. The graft polymer obtained, i.e. carboxyl-modified saponified product of ethylene-vinyl acetate copolymer, has an acid equivalent weight of up to 50000 g/equivalent, preferably 1000 to 10000 g/equivalent, in its entirety.

The inorganic compound, the other component of the thermally adhesive composition layer, to be used is at least one compound selected from the group consisting of oxides, hydroxides, carbonates and sulfates of magnesium, calcium, aluminum, titanium and silicon, talc, clay, feldspar powder, mica and barite. It is especially preferable to use carbonate of calcium or talc. The inorganic compound is 0.1 to 50 $\mu$m, preferably 0.5 to 30 $\mu$m, in mean particle size.

The thermally adhesive composition for forming the layer comprises the carboxyl-modified saponified product of ethylene-vinyl acetate copolymer and the inorganic compound admixed therewith in an amount of up to 30 parts by weight, usually 0.1 to 10 parts by weight, preferably 1 to 5 parts by weight, per 100 parts by weight of the product.

The carboxyl-modified product and the inorganic compound are mixed together, for example, by a single-screw extruder, twin-screw extruder, Banbury mixer, kneader or the like, usually at a temperature of 120° to 180° C.

The thermally adhesive composition layer is formed on metal foil by making the above composition into a film first and bonding the film to one surface of the metal foil with an adhesive such as a polyester-isocyanate type, two-component adhesive, or by extruding the composition in a molten state over the metal foil surface by an extruder for direct bonding.

The thermally adhesive composition layer is usually 20 to 100 $\mu$m in thickness. When required, a film of polyethylene, polypropylene or like resin may be provided between the composition layer and the metal foil. The intermediate layer gives improved cushioning properties to the resulting material for heat-sealing operation. When the glass container to be sealed is intended to contain food, such as dressing or mustard, which is highly corrosive to the metal foil, it is desirable to provide a corrosion inhibiting coat layer between the metal foil and the composition layer. The other surface of the metal foil is usually printed on as required, and a corrosion inhibiting coat layer is further formed over the surface of the print. The closure material comprising the metal foil and thermally adhesive composition layer is continuously blanked in a suitable shape and size for covering the mouth of glass containers contemplated.

When the carboxyl-modified saponified product of ethylene-vinyl acetate copolymer contained in the thermally adhesive composition layer has a hydroxyl equivalent weight which is outside the range of 100 to 3000 g/equivalent and an acid equivalent weight which is outside the range of up to 50000 g/equivalent, and also when the amount of inorganic compound incorporated in the layer is outside the range of up to 30 parts by weight per 100 parts by weight of the modified product, the composition layer has lower amenability to sealing at low temperatures, and the seal is susceptible to rupture when exposed to food, such as jam or yoghurt, having a high water content. Furthermore, the composition joined to the metal foil then exhibits blocking, i.e. tacky, properties, making it impossible to continuously blank the closure material, hence objectionable.

As described above, the present closure material comprises a metal foil and a thermally adhesive composition layer formed on one surface of the metal foil and comprising a carboxyl-modified saponified product of ethylene-vinyl acetate copolymer and up to 30 parts by weight of an inorganic compound per 100 parts by weight of the carboxyl-modified saponified product, the carboxyl-modified saponified product being prepared by graft-polymerizing a carboxylic acid group-containing unsaturated compound with a saponified product of ethylene-vinyl acetate copolymer containing 50 to 97 mole % of ethylene. Accordingly the closure material can be bonded directly to the mouths of glass containers by heat sealing at a relatively low temperature within a short period of time, and dessert, chilled food, etc. which can not be filled at a high temperature can be packaged by sealing with use of the closure material, while the material has high sealing properties. Moreover, the closure obtained is easy to open, will not permit resin to remain on the mouth portion of the container when opened and gives a neat appearance to the mouth opened. Further because the closure material is amenable to heat sealing at a relatively low temperature, the filling-sealing apparatus to be used is low in equipment cost and running cost and yet achieves an improved efficiency. While a rubber cushion or the like is usually attached to the sealing machine to assure uniform heat sealing, the present material reduces the likelihood of thermal deterioration of the cushion member, rendering the apparatus easier to maintain and control.

BRIEF DESCRIPTION OF THE DRAWINGS

More specifically, FIG. 1 shows a closure material comprising aluminum foil 1 having a corrosion inhibiting coat layer 4 on one surface, and a thermally adhesive composition layer 2 formed over the other surface of the foil 1 and composed of a carboxyl-modified saponified product of ethylene-vinyl acetate copolymer and an inorganic compound, an adhesive layer 3 being provided between the aluminum foil 1 and the composition layer 2.

FIG. 2 shows another closure material comprising aluminum foil 1, a print layer 5 formed on one surface of the foil 1, a corrosion inhibiting coat layer 4 formed on the surface of the print layer 5, a corrosion inhibiting coat layer 6 formed on the other surface of the aluminum foil 1 for inhibiting the corrosion of the foil 1 due to the contents of the container, and a thermally adhesive composition layer 2 formed over the coat layer 6, with an adhesive layer 3 formed between the layers 6 and 2.

EXAMPLES

The present invention will be described in detail with reference to the following examples and comparative examples.

EXAMPLE 1

Figure 1:
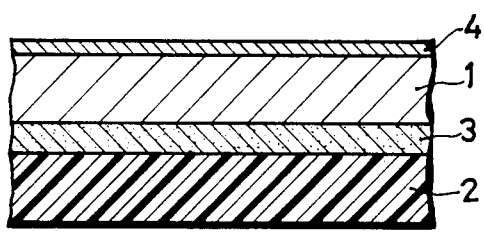
FIG. 1 is an enlarged fragmentary view in section showing an embodiment of the present invention.
Figure 2:
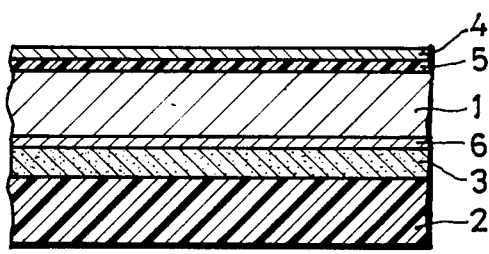
FIG. 2 is an enlarged fragmentary view in section showing another embodiment of the invention.

Referring to FIG. 1, a closure material was prepared by forming a corrosion inhibiting coat layer 4 on one surface of aluminum foil 1 having a thickness of 50 $\mu$m, and bonding a 50-$\mu$m-thick thermally adhesive composition layer 2 to the other surface of the foil 1 with an adhesive layer 3. The thermally adhesive composition used for the layer 2 was prepared by graft-polymerizing acrylic acid with a saponified product of ethylene-vinyl acetate copolymer containing 87 mole % of ethylene to obtain a carboxyl-modified product having a hydroxyl equivalent weight of 490 g/equivalent and an acid equivalent weight of 2880 g/equivalent, and uniformly dispersing 5% by weight of calcium carbonate, about 1 $\mu$m in mean particle size, in the carboxyl-modified product.

The closure material thus obtained was blanked by a punch press in the specified shape and size corresponding to the mouth of glass containers. It was possible to blank out closures smoothly without blocking of the composition layer 2.

Subsequently, water of 20° C. was filled into the glass container, and the closure was pressed against the mouth of each container at a pressure of 160 kg with heating at 180° C. for 2 seconds to directly join the closure to the mouth by heat sealing. The sealed containers were checked for the pressure-resistant strength of the closure immediately after the heat sealing and after allowing the container to stand in an inverted position at room temperature for 8 days. The results are given in the table below.

EXAMPLE 2

The thermally adhesive composition used was prepared by graft-polymerizing acrylic acid with a saponified product of ethylene-vinyl acetate copolymer containing 87 mole % of ethylene to obtain a carboxyl-modified product having the properties given below, and uniformly dispersing 3% by weight of talc, about 2 $\mu$m in mean particle size, in the product. The carboxyl-modified product had a hydroxyl equivalent weight of 455 g/equivalent and an acid equivalent weight of 1358 g/equivalent.

In the same manner as in Example 1, a layer of the composition was formed on one surface of aluminum foil 1 to obtain a closure material, which was subjected to the same seal test as in Example 1. The table below also shows the results obained.

COMPARATIVE EXAMPLE 1

For comparison, a thermally adhesive composition was used which was prepared by graft-polymerizing maleic anhydride with a saponified product of ethylene-vinyl acetate copolymer to obtain a carboxyl-modified product having the following properties, and uniformly dispersing 5% by weight of calcium carbonate, about 1 μm in mean particle size, in the product. The carboxyl-modified product had a hydroxyl equivalent weight of 455 g/equivalent and an acid equivalent weight of 4900 g/equivalent.

In the same manner as in Example 1, a layer of the composition was formed on one surface of aluminum foil 1 to obtain a closure material, which was subjected to the same seal test as in Example 1. The results are given in the table below.

COMPARATIVE EXAMPLE 2

For comparison, a thermally adhesive resin was used which was free from any inorganic compound and which consisted singly of the same carboxyl-modified product as used in Example 1. In the same manner as in Example 1, a layer of this resin was formed on one surface of aluminum foil to obtain a closure material, which was then subjected to the same seal test as in Example 1. The results are given in the table below.

|  | Blanking operation | | Pressure-resistant strength (kg/cm$^2$) | |
|---|---|---|---|---|
|  | Blocking | Shapability | As heat-sealed | After standing for 8 days |
| Example 1 | None | Good | 0.6 | 0.6 |
| Example 2 | " | " | 0.6 | 0.6 |
| Comp. Ex. 1 | " | " | Not sealable | — |
| Comp. Ex. 2 | Occurred | Poor | 0.2 | 0.1 |

The table above shows that the closure of the present invention can be firmly bonded to the mouth of glass containers by heat sealing at a relatively low temperature of 180° C., and the bond strength remains unimpaired even after a long period of time to assure outstanding sealing properties. The closure material of the invention can be blanked into closures smoothly continuously without the blocking of the thermally adhesive composition layer and therefore ensures an efficient operation.

In contrast, according to Comparative Example 1 wherein a thermally adhesive composition was used which contained a resin obtained by graft-polymerization of carboxylic acid group-free maleic anhydride, the closure material was not amenable to heat sealing at 180° C., hence poor result. Further according to Comparative Example 2 wherein a thermally adhesive resin containing no inorganic compound was used, the closure material, although bondable by heat sealing at 180° C., exhibited very low bond strength which lowered with time. Thus the material has very poor sealing properties. Further when the closure material of Comparative Example 2 was blanked, marked blocking occurred, making it impossible to block the material continuously.

What is claimed is:

1. A closure material for sealing glass containers comprising a metal foil and a thermally adhesive composition layer formed on one surface of the metal foil and comprising a carboxyl-modified saponified product of ethylenevinyl acetate copolymer and 0.1 to 30 parts by weight of an inorganic compound per 100 parts by weight of the carboxyl-modified saponified product, the carboxyl-modified saponified product being prepared by graft-polymerizing acrylic acid with a saponified product of ethylene-vinyl acetate copolymer containing 50 to 97 mole % of ethylene and having a melt index of 1 to 300g/10 minutes.

2. A closure material as defined in claim 1 wherein the metal foil is aluminum foil having a thickness of 20 to 100 μm, and the thermally adhesive composition layer has a thickness of 20 to 100 μm.

3. A closure material as defined in claim 1, wherein the carboxyl-modified saponified product has an acid equivalent weight of 1000 to 10000 g/equivalent in its entirety and the saponified product for the modification has a hydroxyl equivalent weight of 200 to 1000 g/equivalent.

4. A closure material as defined in claim 1 wherein the inorganic compound is at least one compound selected from the group consisting of oxides, hydroxides, carbonates and sulfates of magnesium, calcium, aluminum, titanium and silicon, talc, clay, feldspar powder, mica and barite.

5. A closure material as defined in claim 4 wherein the inorganic compound is one of calcium carbonate and talc.

6. A closure material as defined in claim 1 wherein the inorganic compound is 0.1 to 50 μm in mean particle size.

7. A closure material as defined in claim 1 wherein the thermally adhesive composition for forming the layer comprises 0.1 to 10 parts by weight of the inorganic compound per 100 parts by weight of the carboxyl-modified saponified product of ethylene-vinyl acetate copolymer.

8. A closure material as defined in claim 1 wherein a synthetic resin film layer is provided between the metal foil and the thermally adhesive composition layer.

9. A closure material as defined in claim 9 wherein the synthetic resin film layer is a film of one of polyethylene and polypropylene.

10. A closure material as defined in claim 1 wherein a corrosion inhibiting layer is provided between the metal foil and the thermally adhesive composition layer.

11. A closure material as defined in claim 1 wherein a print layer is formed on the other surface of the metal foil, and a corrosion inhibiting coat layer is formed on the surface of the print layer.

12. A closure material as defined in claim 1 for sealing glass containers made of soda-lime glass.

13. A closure material as defined in claim 1, wherein the thermally adhesive composition for forming the layer comprises 1 to 10 parts by weight of the inorganic compound per 100 parts by weight of the carboxyl-modified saponified product.

14. A closure material as defined in claim 1, wherein the thermally adhesive composition forming the layer comprises 1 to 5 parts by weight of the inorganic compound per 100 parts by weight of the carboxyl-modified saponified product.

* * * * *